US012686108B2

(12) United States Patent
Groth et al.

(10) Patent No.: US 12,686,108 B2
(45) Date of Patent: Jul. 21, 2026

(54) SIDE HANDLE FOR AN ELECTRICAL HAND-HELD POWER TOOL

(71) Applicant: Hilti Aktiengesellschaft, Schaan (LI)

(72) Inventors: Karin Groth, Herrsching (DE); Daniela Lachica Koch, Augsburg (DE); Markus Sommer, Westendorf (DE); Steffen Mucha, Schwabmünchen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 18/845,552

(22) PCT Filed: Mar. 6, 2023

(86) PCT No.: PCT/EP2023/055552
§ 371 (c)(1),
(2) Date: Sep. 10, 2024

(87) PCT Pub. No.: WO2023/174723
PCT Pub. Date: Sep. 21, 2023

(65) Prior Publication Data

US 2025/0205868 A1 Jun. 26, 2025

(30) Foreign Application Priority Data

Mar. 15, 2022 (EP) .................................... 22162090

(51) Int. Cl.
*B25F 5/02* (2006.01)

(52) U.S. Cl.
CPC .................................... *B25F 5/026* (2013.01)

(58) Field of Classification Search
CPC .. B25F 5/024; B25F 5/026; B25F 5/02; B25F 5/006; B24B 23/00; B24B 23/005;
(Continued)

(56) References Cited

U.S. PATENT DOCUMENTS 11,511,400 B2 * 11/2022 Ellice ........................ B25F 5/02
2009/0178520 A1 * 7/2009 Engelfried .............. B25F 5/026
81/489

(Continued)

FOREIGN PATENT DOCUMENTS

CN 202781094 U * 3/2013
CN 105345753 B * 12/2018

(Continued)

OTHER PUBLICATIONS

ISR oof PCT/EP2023/055552 filed May 22, 2023.

*Primary Examiner* — Chuck Y Mah
(74) *Attorney, Agent, or Firm* — Davidson Kappel LLC

(57) ABSTRACT

Side handle for an electrical hand-held power tool, the side handle having a gripping region designed for gripping by a user and a clamping unit by which the side handle can be detachably fastened to a tool neck of the hand-held power tool, wherein the clamping unit has an operating element by which the clamping unit can be clamped and released, wherein the clamping unit substantially contains a clamping lever, a clamping element, a counter clamping element and a connecting device, and when the clamping unit is clamped, a force flow passes through the clamping unit and the counter clamping element can be moved relative to the gripping region.

13 Claims, 21 Drawing Sheets

(58) Field of Classification Search
CPC .. B24B 29/00; B27B 9/00; B25G 1/06; B25G 1/00; B25G 3/38
See application file for complete search history.

(56) References Cited

U.S. PATENT DOCUMENTS

| | | | | |
|---|---|---|---|---|
| 2010/0064480 | A1 | 3/2010 | Martin et al. | |
| 2010/0064482 | A1 * | 3/2010 | Martin .................... | B25F 5/026 16/426 |
| 2012/0312572 | A1 * | 12/2012 | Nemetz ................... | B25F 5/006 248/220.22 |
| 2016/0114472 | A1 * | 4/2016 | Holubarsch ............. | B25F 5/026 16/426 |
| 2018/0050447 | A1 * | 2/2018 | Geiger .................... | B25F 5/006 |
| 2021/0260734 | A1 | 8/2021 | Kubale et al. | |
| 2022/0241953 | A1 | 8/2022 | Lachica Koch et al. | |

FOREIGN PATENT DOCUMENTS

| | | | | |
|---|---|---|---|---|
| DE | 102007039245 | A1 * | 5/2008 | ............... B25G 3/38 |
| DE | 102008042114 | A1 | 3/2010 | |
| EP | 1400317 | A1 | 3/2004 | |
| EP | 1974867 | B1 | 12/2009 | |
| EP | 3034245 | A1 | 6/2016 | |
| EP | 3756833 | A1 | 12/2020 | |
| JP | H09109065 | A * | 4/1997 | |
| JP | 2006321008 | A | 11/2006 | |

* cited by examiner

SIDE HANDLE FOR AN ELECTRICAL HAND-HELD POWER TOOL

The present invention relates to a side handle for an electrical hand-held power tool.

BACKGROUND

Side handles of the type mentioned at the outset are in principle known from the prior art. EP 1 974 867 1 discloses a handle for a hand-held power tool comprising a pair of clamping halves, an operating device which has an operating part which is suitable for opening and closing the clamping halves relative to the mounting part, and a handle body which is configured for gripping by an operator.

SUMMARY OF THE INVENTION

Side handles of this type are subject to a high mechanical stress due to fixed clamping on a power tool, which mean a great load on all components of the side handle and in particular on the handle. This mechanical stress can often lead to damage to individual components or to complete failure of the side handle.

It is an object of the present invention, which solves the problem described above and, in particular, to provide a better side handle or a side handle with a higher load capacity.

The present invention provides a side handle for an electrical hand-held power tool. The side handle has a gripping region designed for gripping by a user and a clamping unit. By means of the clamping unit, the side handle can be detachably fastened to a tool neck of the hand-held power tool, wherein the clamping unit has an operating element by means of which the clamping unit can be clamped and released.

According to the invention, it is provided that the clamping unit substantially contains a clamping lever, a clamping element, a counter clamping element and a connecting device and, when the clamping unit is clamped, a force flow passes through the clamping unit and the counter clamping element can be moved relative to the gripping region As a result, the mechanical load on the side handle can be reduced.

According to a further advantageous embodiment, it may be possible for the gripping region to contain at least one guide element through which the counter clamping element can be guided in at least one direction.

According to a further advantageous embodiment, it may be possible for the guide element to contain a through-hole so that the counter clamping element can be guided in an axial direction.

According to a further advantageous embodiment, it may be possible for the clamping element to be designed as a first latching sleeve.

According to a further advantageous embodiment, it may be possible for the clamping element to contain a helical slotted link with at least a first and a second portion, wherein the first portion has a first inclination and the second portion has a second inclination, and wherein the first inclination is greater than the second inclination. In other words, the first inclination can be more rigid than the second inclination. Due to the large inclination, a relatively large axial distance can be covered by a relatively small rotational movement of the clamping element. In comparison, due to the small inclination, a relatively large rotational movement must be covered for a relatively small axial distance. Due to the two different inclination of the slotted link of the clamping element, a different effect can be achieved when the clamping lever is rotated or when the clamping unit is clamped.

According to a further advantageous embodiment, it may be possible for the counter clamping element to be designed as a second latching sleeve.

According to a further advantageous embodiment, it may be possible for the connecting device to contain a first and a second connecting piece.

According to a further advantageous embodiment, it may be possible for the closure element to be designed as a rotary closure.

It has been found to be advantageous if the operating element is designed as a clamping lever. In a particularly preferred embodiment, the clamping lever is arranged on the side handle so as to be rotatable about an axis of rotation with respect to the gripping region. The axis of rotation preferably extends perpendicularly to a working axis of the hand-held power tool when the side handle is fastened to the hand-held power tool. In a further particularly preferred embodiment, the rotation of the clamping lever about the axis of rotation is limited to 360 degrees, preferably to 110 degrees. In this respect, it has been recognized that in the case of side handles of the prior art, a repeated, lengthy rotation of the operating part is typically required in order to adjust and shift the side handle to the desired position both around the working axis of the hand-held power tool and into the tilting axis. In other words, in the case of side handles of the prior art, a clamping strap, which by a clamping screw interacting with the operating part, must be rotated several times, i.e., by more than 360 degrees.

It has been found to be advantageous if a stop is formed on the clamping lever, said stop preferably being designed to be complementary to a counter stop provided on the gripping region. The gripping region can have a hollow profile or can be formed substantially by such a hollow profile.

The clamping unit can have two clamping bodies in the form of cylinder portions, each of which is oriented coaxially to a clamping screw of the clamping unit, said clamping screw extending in the axis of rotation. Preferably, the clamping unit has a clamping strap holder and a clamping strap provided for encompassing the tool neck. Preferably, one of the clamping bodies in the form of cylinder portions is formed in one piece with the clamping lever or at least connected thereto in a rotationally fixed manner. The clamping strap holder can have two holding bodies, preferably exactly two holding bodies. The clamping screw can be connected to the clamping lever in a rotationally fixed manner, for example via a hexagon.

In a particularly embodiment, the clamping strap is or can be hooked into the clamping strap holder. Advantageously, the clamping strap is free of a through-hole intended for a clamping screw. This has the advantage that the side handle can be preassembled at the factory and can be mounted on hand-held power tools, the tool holder of which has a larger diameter than its tool neck, only by unhooking or hooking the clamping strap. In the case of side handles of the prior art, a substantially complete disassembly of the side handle, but at least of the clamping unit, is typically required in such situations. Due to the advantageous design of the clamping strap holder with a hookable clamping strap, a time saving and thus also a cost saving can be achieved during assembly.

It has also been found to be advantageous if the clamping strap holder has a depression, which is recessed in the radial direction and has a retaining lug, in such a way that instead of the hooked clamping strap with a first diameter, a second clamping strap with a second diameter, which is different from the first diameter, can be hooked. The retaining lug can have a spring contact surface of which the curvature is greater than a clamping surface of the clamping strap holder in contact with the tool neck. Advantageously, one and the same clamping strap holder can be used for hand-held power tools of different tool neck diameters. Advantageously, a system consisting of a side handle with a plurality of clamping straps with different diameters is provided, wherein each clamping strap can be hooked into one and the same clamping strap holder.

In a further preferred embodiment, the clamping strap holder has two coaxial holding bodies, wherein at least one of the holding bodies can be clamped by means of a cone/hollow cone pairing with one of the clamping bodies in the form of cylinder portions. A second one of the holding bodies can be clamped by means of a cone/hollow cone pairing with a handle end piece of the side handle. The handle end piece can be formed in one piece with a gripping region. The cone/hollow cone pairing can be assigned a cone formed on the second clamping body and/or a hollow cone formed on the first holding body, or vice versa. A cone/hollow cone pairing can be provided between the handle end piece and the second holding body.

The clamping strap holder can have at least one surface portion on a side facing the tool neck, said surface portion having an increased coefficient of friction and/or an increased modulus of elasticity in relation to the remaining part of the clamping holder.

According to a further independent subject matter for which protection is sought, a side handle for an electrical hand-held power tool is provided, wherein the side handle has a gripping region designed for gripping by a user and a clamping unit by means of which the side handle can be detachably fastened to a tool neck of the hand-held power tool, wherein the clamping unit has an operating element by means of which the clamping unit can be clamped and released. The clamping unit furthermore comprises a clamping strap holder and a clamping strap provided for encompassing the tool neck, wherein the clamping strap is hooked into the clamping strap holder and is preferably free of a through-hole intended for a clamping screw. The clamping strap holder can have a depression, which is recessed in the radial direction and has a retaining lug, in such a way that instead of the hooked clamping strap with a first diameter, a second clamping strap with a second diameter, which is different from the first diameter, can be hooked, wherein the retaining lug preferably has a spring contact surface of which the curvature is greater than a clamping surface of the clamping strap holder in contact with the tool neck. The side handle can be designed in a corresponding manner by the features described with reference to the exemplary embodiments of the side handle according to the invention.

According to a further independent subject matter for which protection is sought, a side handle for an electrical hand-held power tool is provided, wherein the side handle has a gripping region designed for gripping by a user and a clamping unit by means of which the side handle can be detachably fastened to a tool neck of the hand-held power tool, wherein the clamping unit has an operating element by means of which the clamping unit can be clamped and released. The clamping strap holder can have at least one surface portion on a side facing the tool neck, said surface portion having an increased coefficient of friction and/or an increased modulus of elasticity in relation to the remaining part of the clamping holder. The side handle can be designed in a corresponding manner by the features described with reference to the exemplary embodiments of the side handle according to the invention.

According to a further independent subject matter for which protection is sought, a side handle for an electrical hand-held power tool is provided, wherein the side handle has a gripping region designed for gripping by a user and a clamping unit by means of which the side handle can be detachably fastened to a tool neck of the hand-held power tool, wherein the clamping unit has an operating element by means of which the clamping unit can be clamped and released. The clamping unit can have two clamping bodies in the form of cylinder portions, each of which is oriented coaxially to a clamping screw of the clamping unit, said clamping screw extending in the axis of rotation, and furthermore has a clamping strap holder with two coaxial holding bodies, wherein at least one of the holding bodies can be clamped by means of a cone/hollow cone pairing with one of the clamping bodies in the form of cylinder portions. The side handle can be designed in a corresponding manner by the features described with reference to the exemplary embodiments of the side handle according to the invention.

Further advantages can be found in the following description of the figures. Different exemplary embodiments of the present invention are shown in the figures. The figures, the description, and the claims contain numerous features in combination. A person skilled in the art will expediently also consider the features individually and combine them to form further meaningful combinations.

BRIEF DESCRIPTION OF THE DRAWINGS

In the figures, identical and equivalent components are provided with the same reference signs. In the drawings.

DETAILED DESCRIPTION

Figure 1:
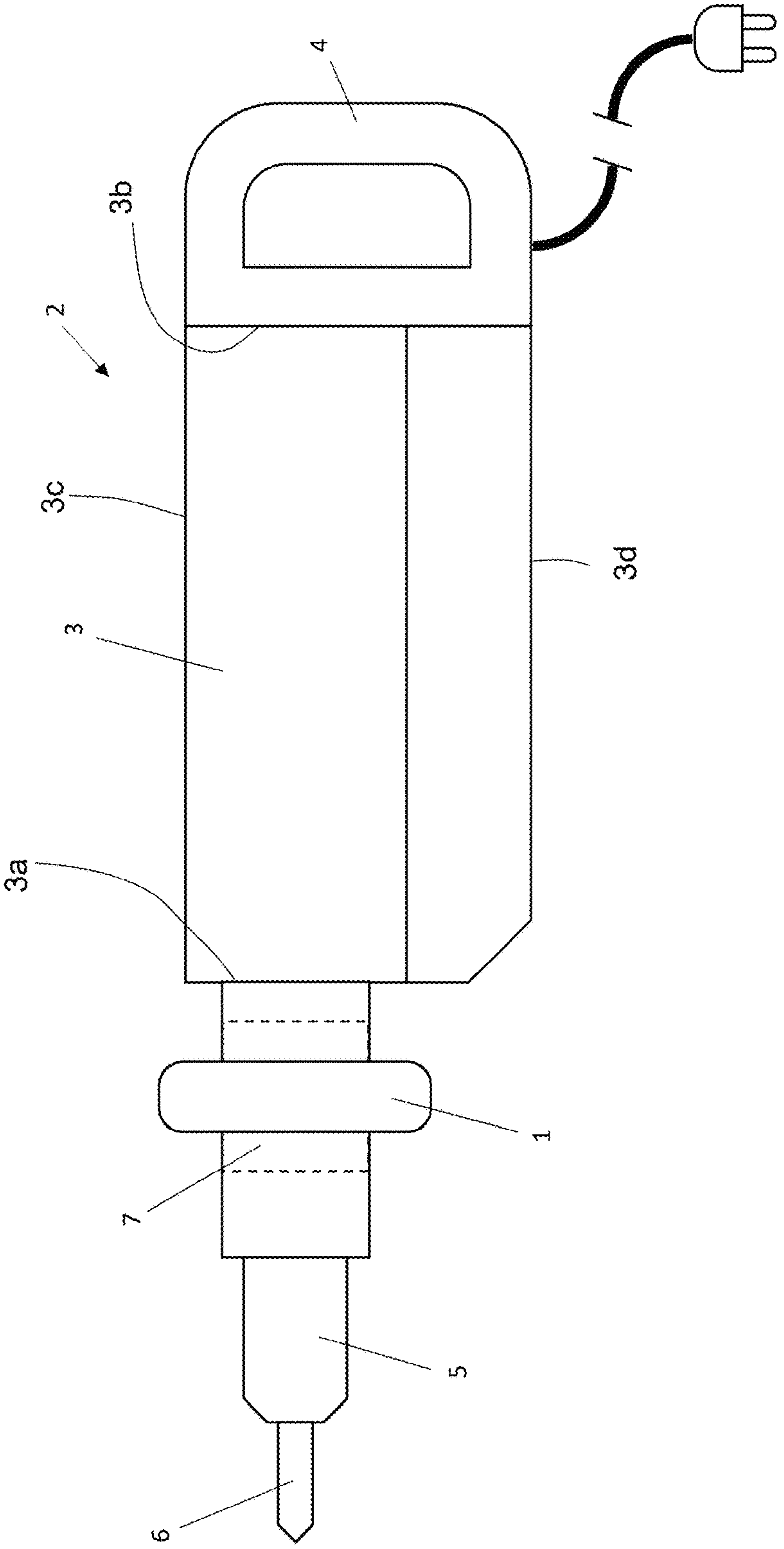
FIG. 1 is a side view of a schematically illustrated power tool.

A preferred exemplary embodiment of a side handle 1 according to the invention for an electric power tool 2, for example a chisel hammer, is shown in FIG. 1.

The power tool 2 designed as a chisel hammer substantially contains a housing 3, a main handle 4 and tool holder 5; cf. FIG. 1.

The housing 3 has a front end 3*a*, a rear end 3*b*, an upper face 3*c* and a bottom face 3*d*. The tool holder 5 is positioned at the front end 3*a* of the housing 3 and in turn is designed for receiving and holding a tool 6 designed as a chisel.

The interior of the power tool 2 inter alia contains a drive, an impact device, a gear unit and a control device.

A tool neck 7 to which the side handle 1 can be mounted is provided at the front end 3*a* of the housing 3 and in the vicinity of the tool holder 5. The side handle 1 is used as an additional holding and guiding means for holding and guiding the power tool 2.

The side handle 1 is shown in detail in FIGS. 2 to 8 and substantially contains a clamping unit 8 with a gripping region 9, a clamping lever 10, a closure cap 11 (see, e.g., FIG. 5), a clamping element 12, a clamping screw 13 (see, e.g., FIG. 5), a counter clamping element 14, a connecting device 15 (see, e.g., FIG. 5), a clamping strap 36 and a closure element 17.

Figure 9:
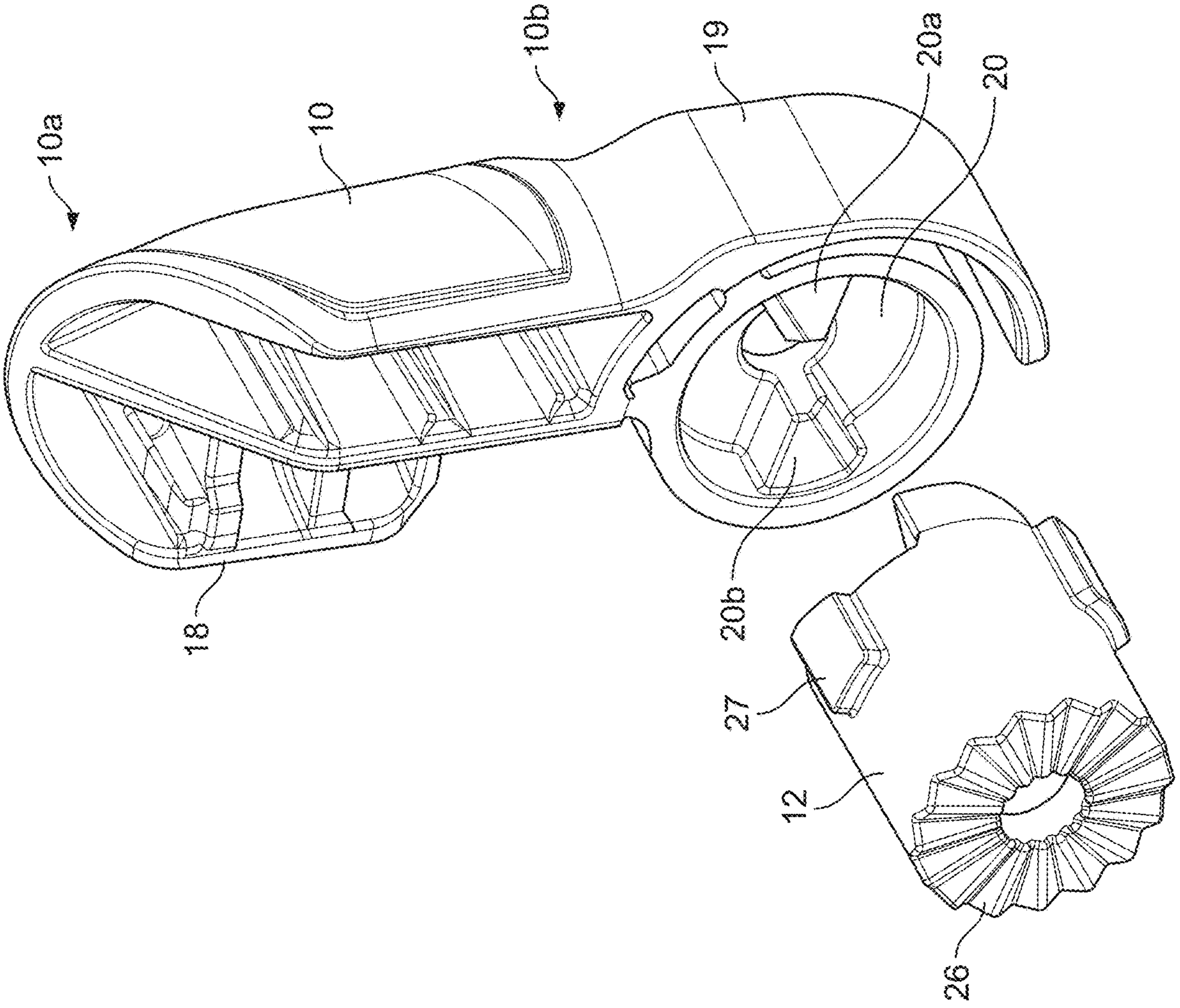
FIG. 9 is a perspective view of a clamping element and a clamping lever.
Figure 10:
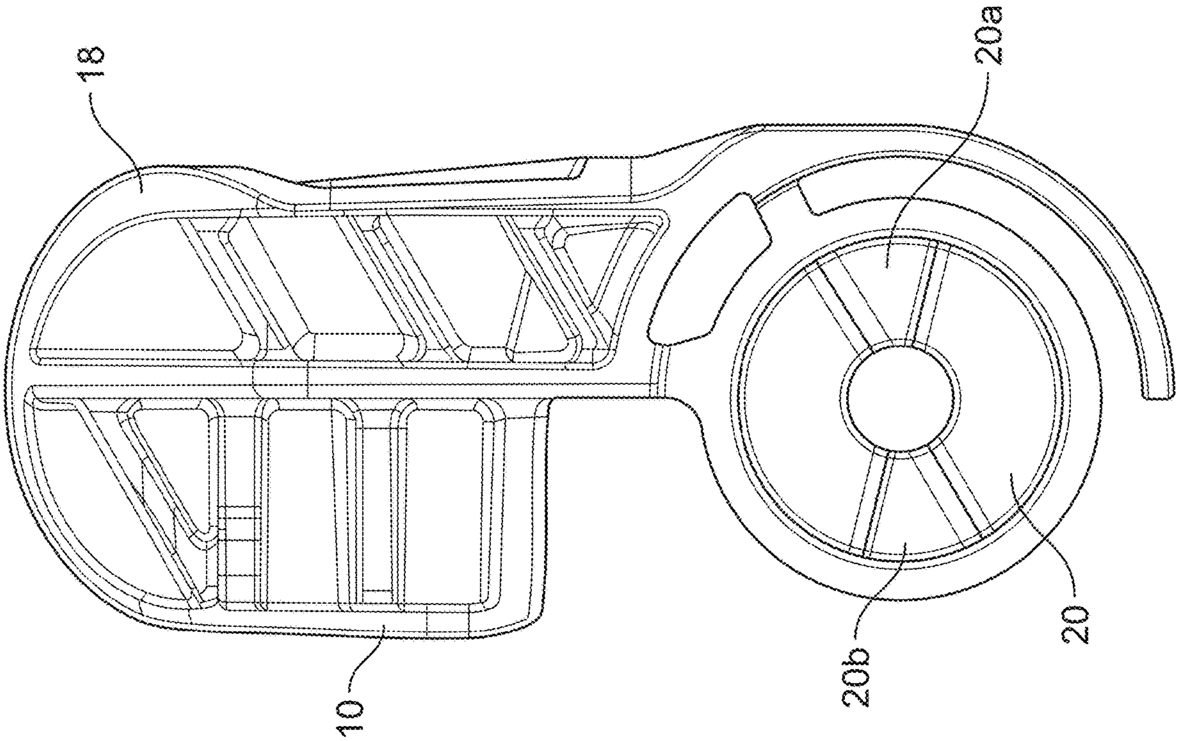
FIG. 10 is a front view of the clamping lever.
Figure 11:
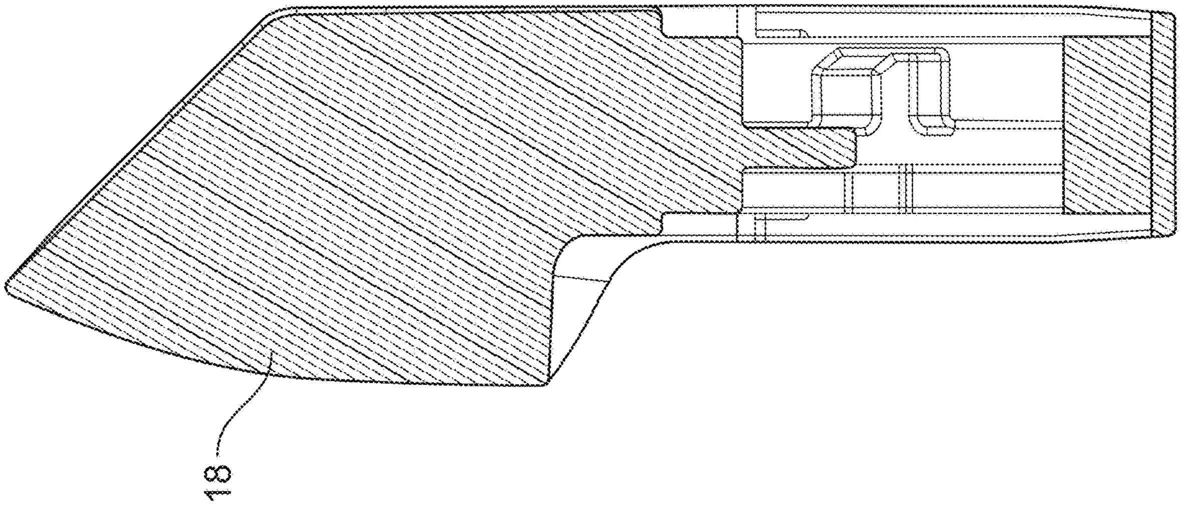
FIG. 11 is a sectional side view of the clamping lever.
Figure 12:
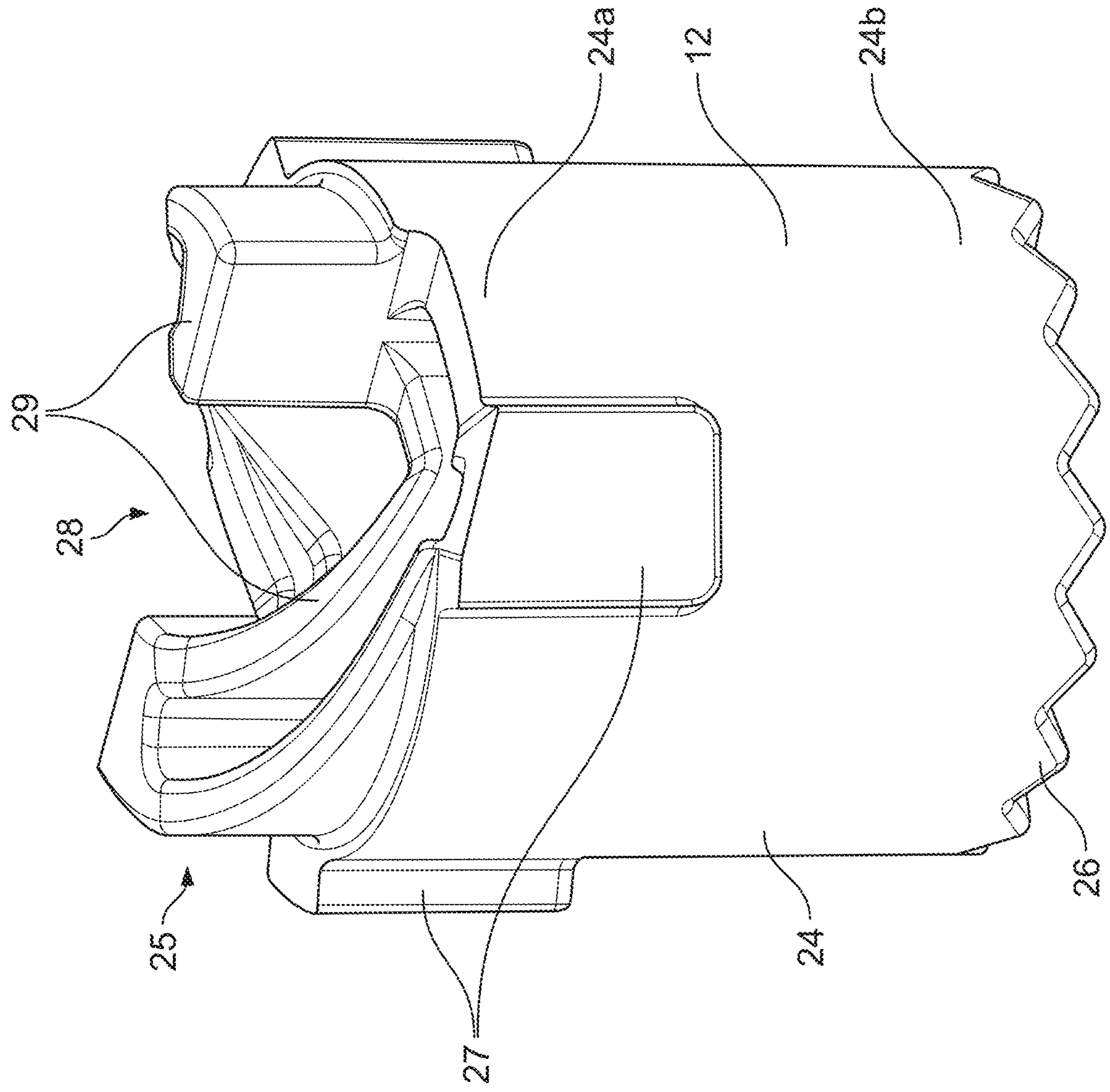
FIG. 12 is a perspective view of the clamping element.
Figure 13:
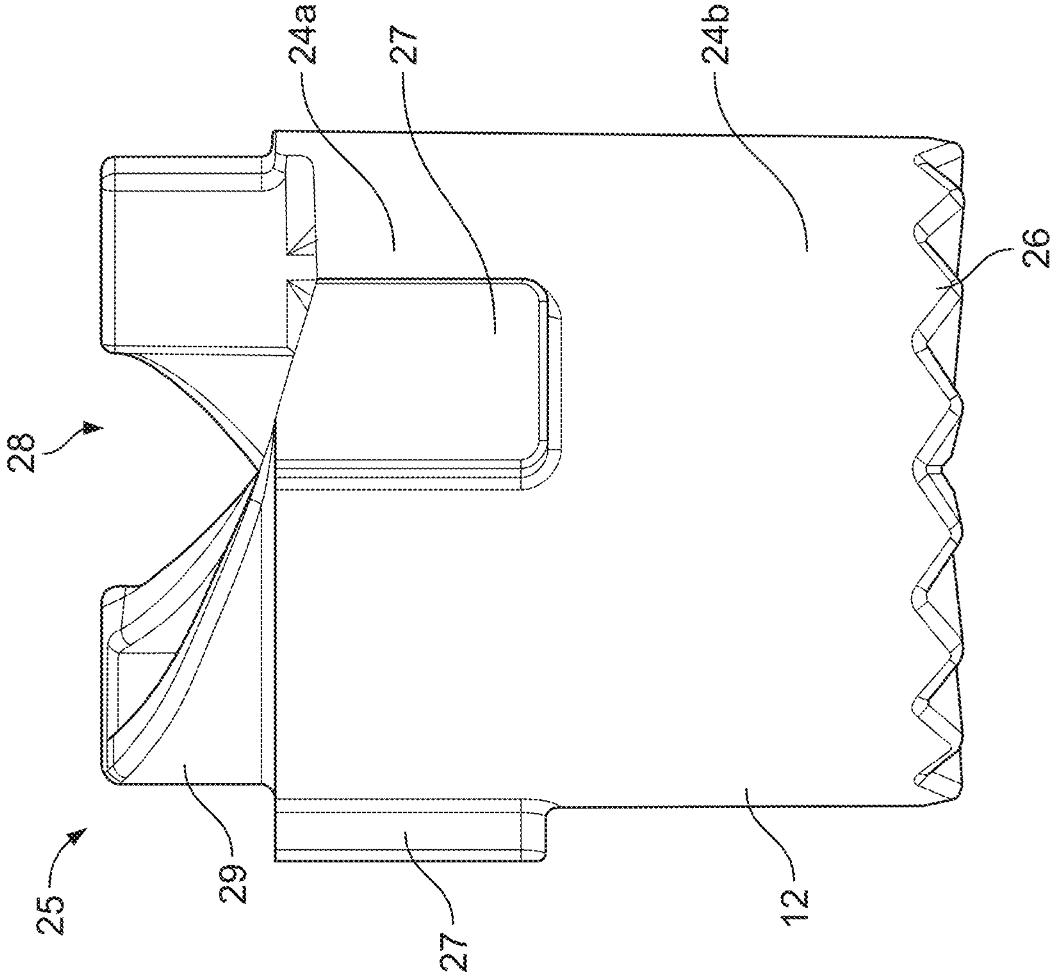
FIG. 13 is a first side view of the clamping element.
Figure 14:
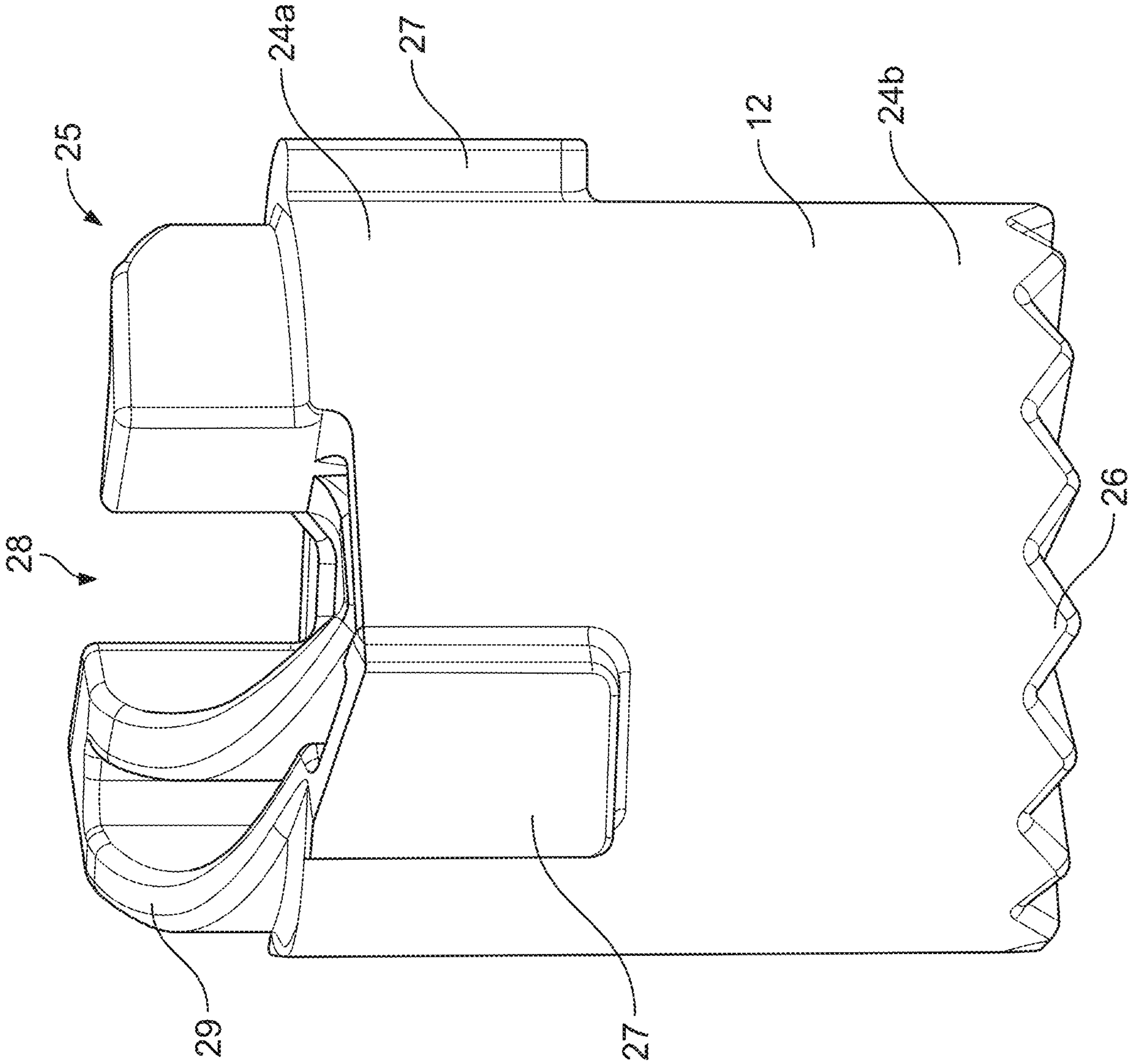
FIG. 14 is a second side view of the clamping element.
Figure 15:
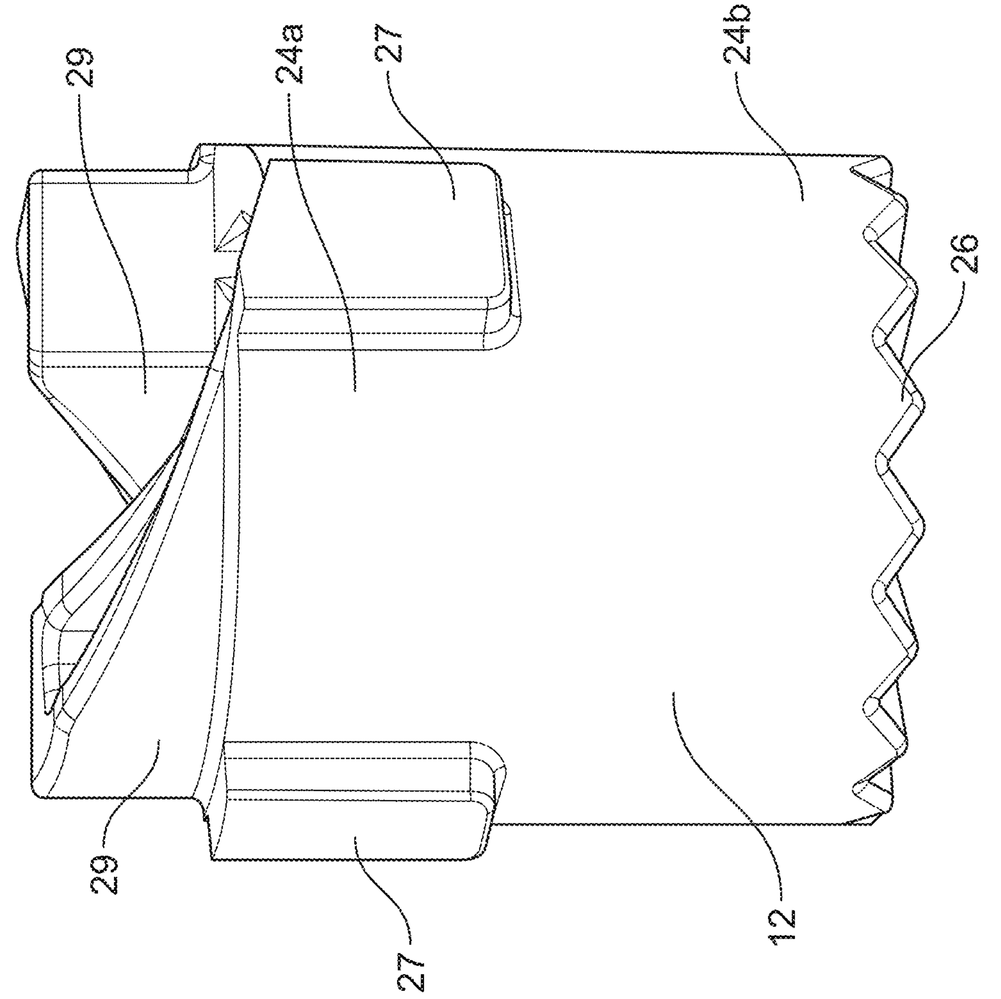
FIG. 15 is a third side view of the clamping element.
Figure 16:
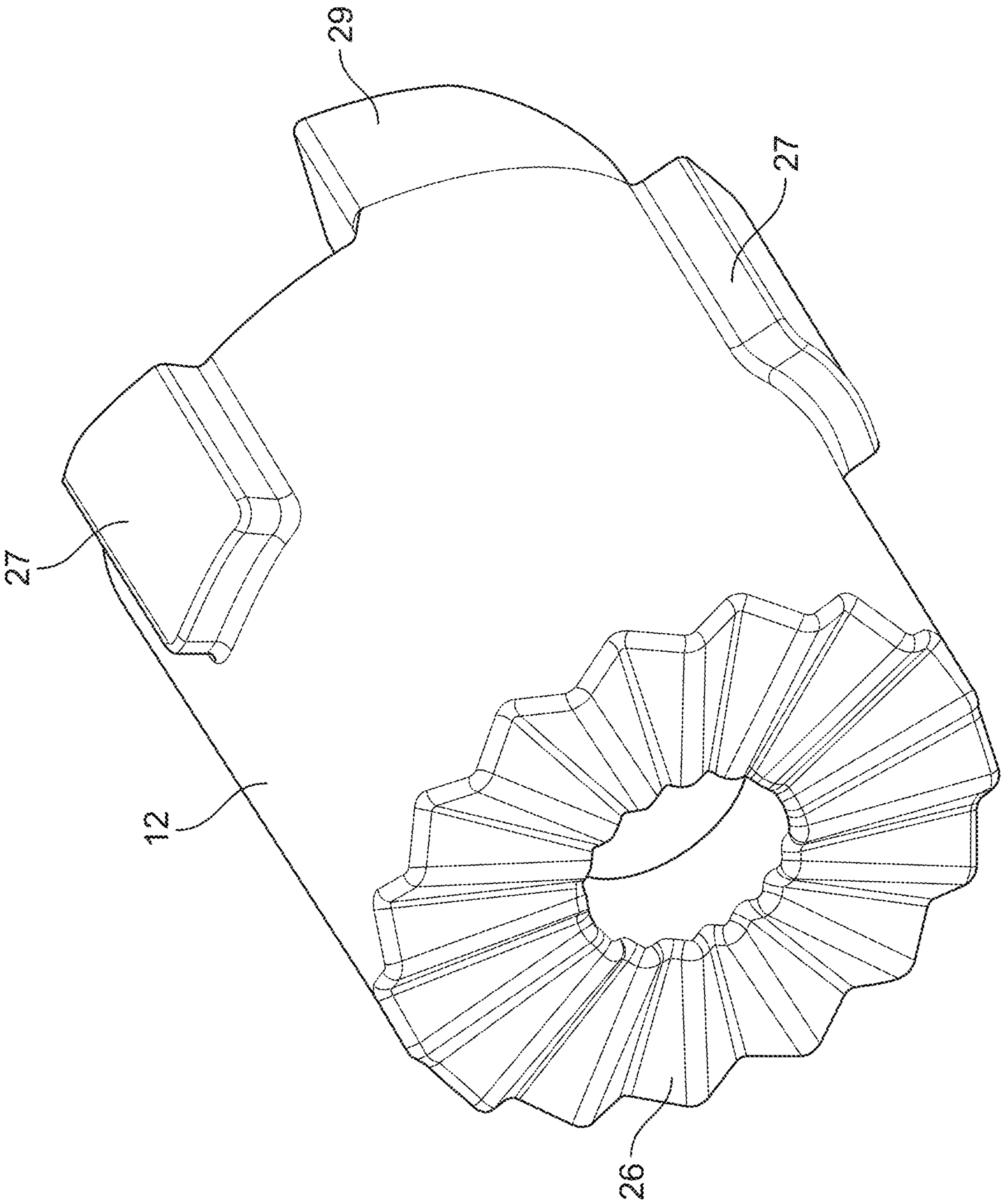
FIG. 16 is a perspective bottom view of the clamping element.

The clamping lever 10 contains an operating element 18 at a first end 10*a* of the clamping lever 10 and a driver element 19 at a second end 10*b* of the clamping lever 10. (See, e.g., FIG. 9). The driver element 19 is used to interact with the clamping element 12 and has a circular receiving region 20 with two opposite elevations 20*a*, 20*b*. The elevations 20*a*, 20*b* can also be referred to as cams.

The clamping screw 13 is elongate or cylindrical and is substantially used to hold together or support the clamping unit 8. A screw head 21 is provided at a first end 13*a* and a thread 22 for a screw nut 23 is provided at a second end 13*b*. (See, e.g., FIGS. 5 and 6)

In the present exemplary embodiment, the clamping element 12 is designed as a first latching sleeve. As shown in FIGS. 12 to 18, the clamping element 12 designed as a first latching sleeve contains a cylindrical main body 24, a ramp device 25 at a first end 24*a* (see, e.g., FIG. 12) of the main body 24 and a crown gear 26 at a second end 24*b* of the main body 24. Three anti-rotation locks 27 in the form of elevations are positioned on the outer lateral surface of the main body 24 of the first latching sleeve 12; cf. FIGS. 17 and 18. The ramp device 25 is used to interact with the driver element 19 of the clamping lever 10 and in the present embodiment is designed as a helical slotted link 28 with two ramp elements 29. The helical slotted link can also be referred to as a spiral, coil-shaped or screw-shaped slotted link. The helical slotted link can also be referred to as a slotted link or ramp device with two helical ramp elements.

Figure 17:
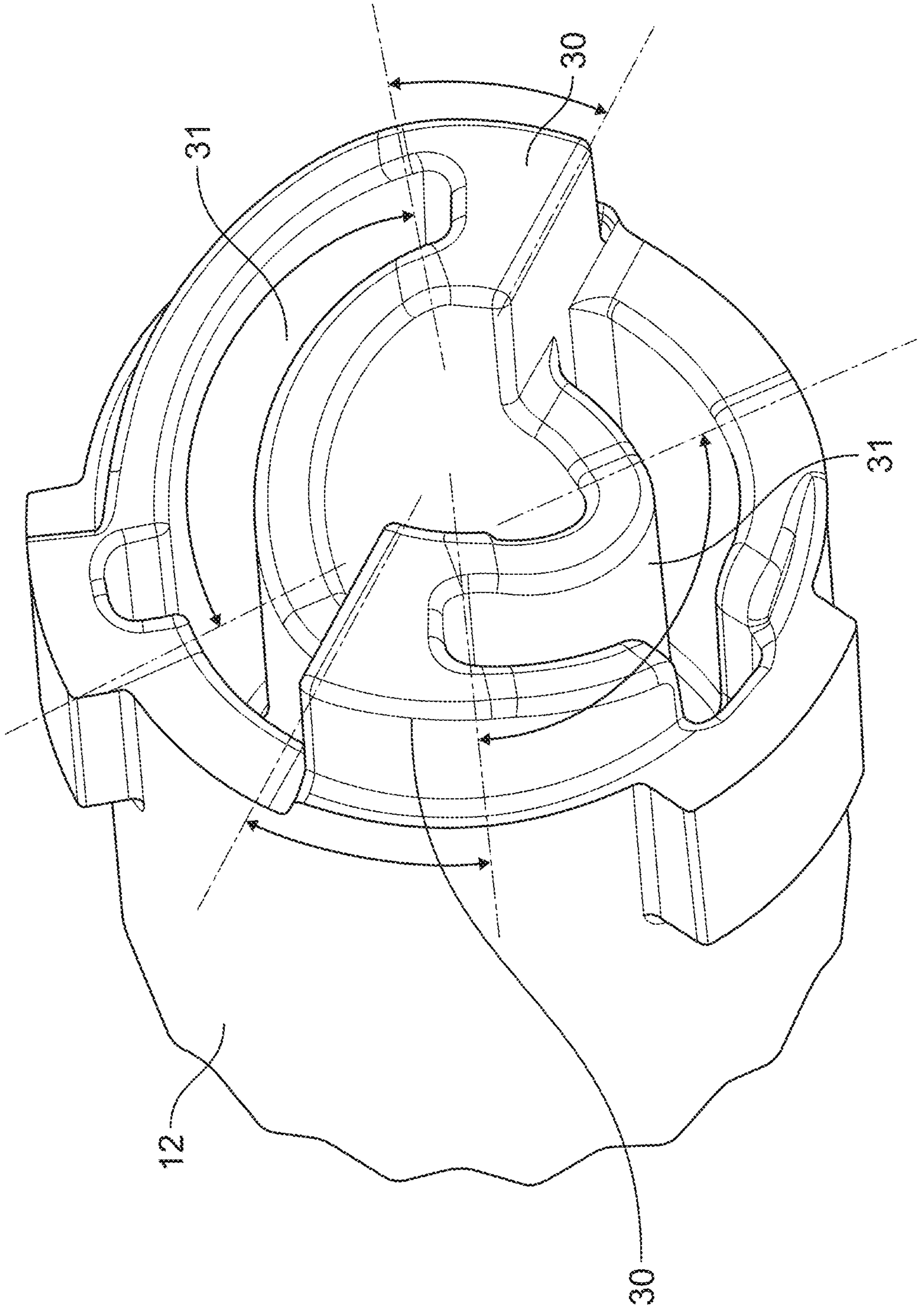
FIG. 17 is a perspective plan view of the clamping element.
Figure 18:
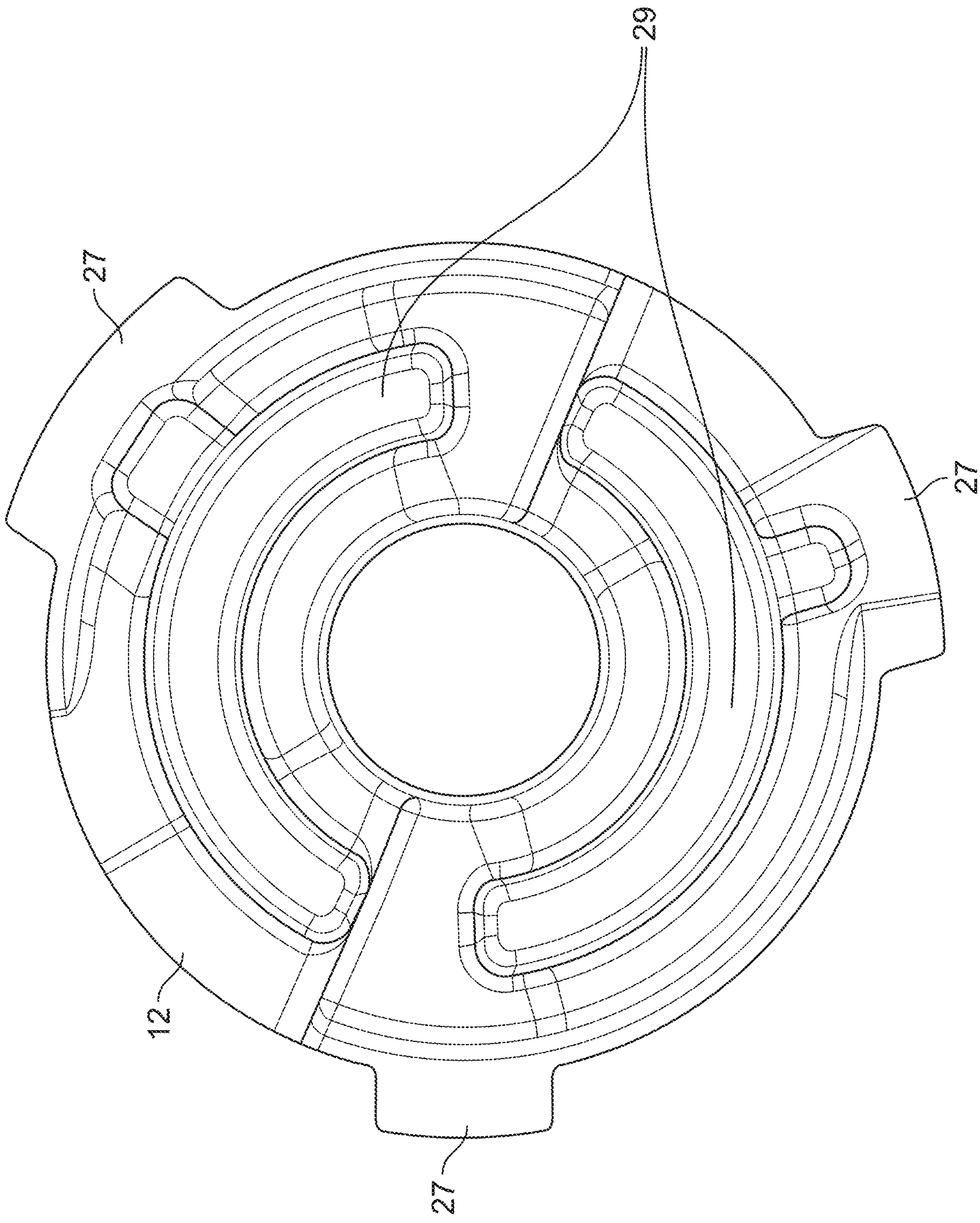
FIG. 18 is a bottom view of the clamping element.
Figure 19:
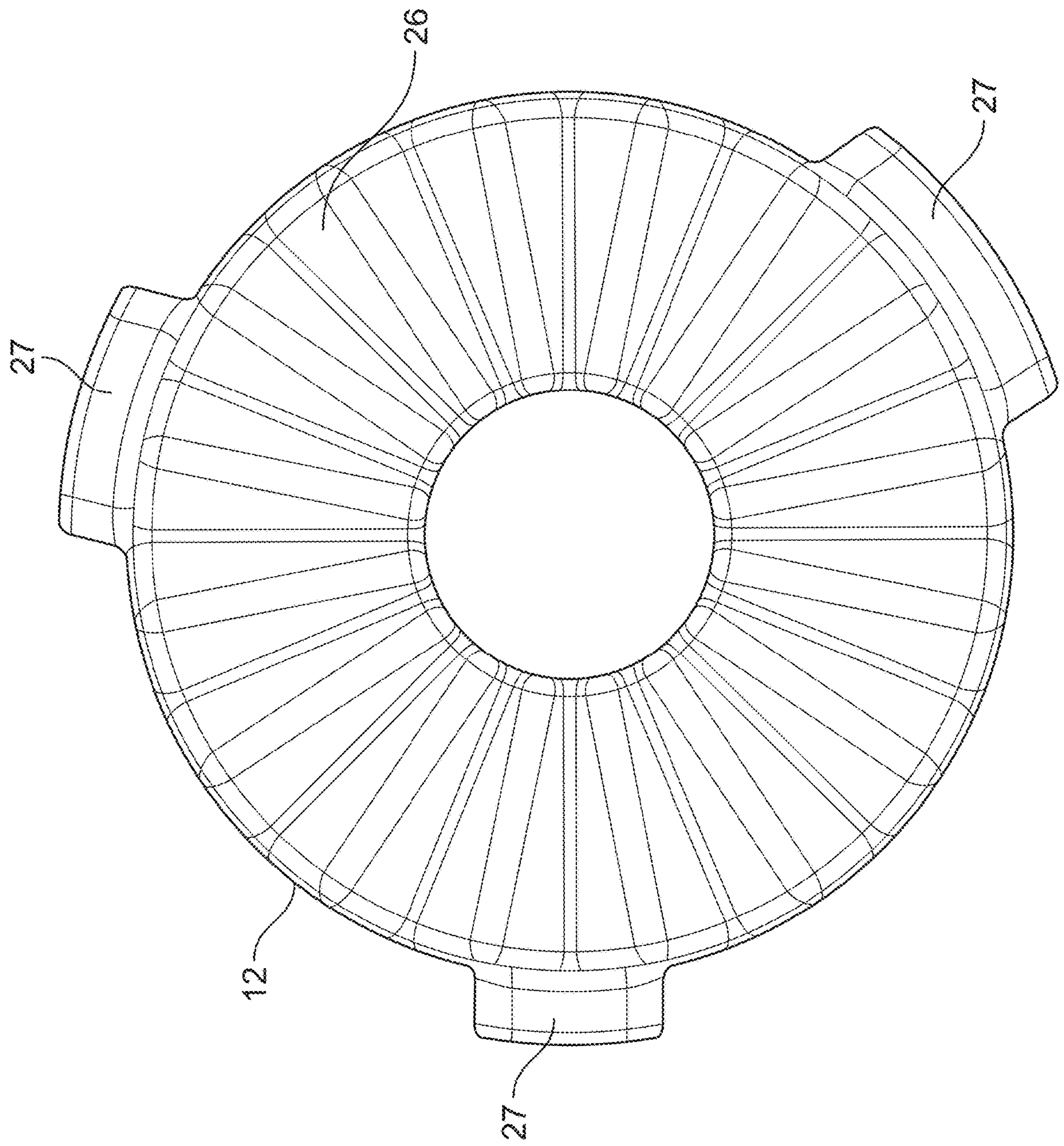
FIG. 19 is a plan view of the clamping element.

As shown in FIG. 17, the helical slotted link 28 (see, e.g., FIG. 13) according to the present exemplary embodiment a first and a second portion 30, 31, wherein the first portion 30 has a first inclination and the second portion 31 has a second inclination, and wherein the first inclination is greater than the second inclination. In other words, the first inclination can be more rigid than the second inclination. Due to the large inclination, a relatively large axial distance can be covered by a relatively small rotational movement of the clamping element 12. In comparison, due to the small inclination, a relatively large rotational movement must be covered for a relatively small axial distance. Due to the two different inclinations of the slotted link 28 of the clamping element 12, a different effect can be achieved when the clamping lever 10 is rotated or when the clamping unit 8 is clamped.

Figure 6:
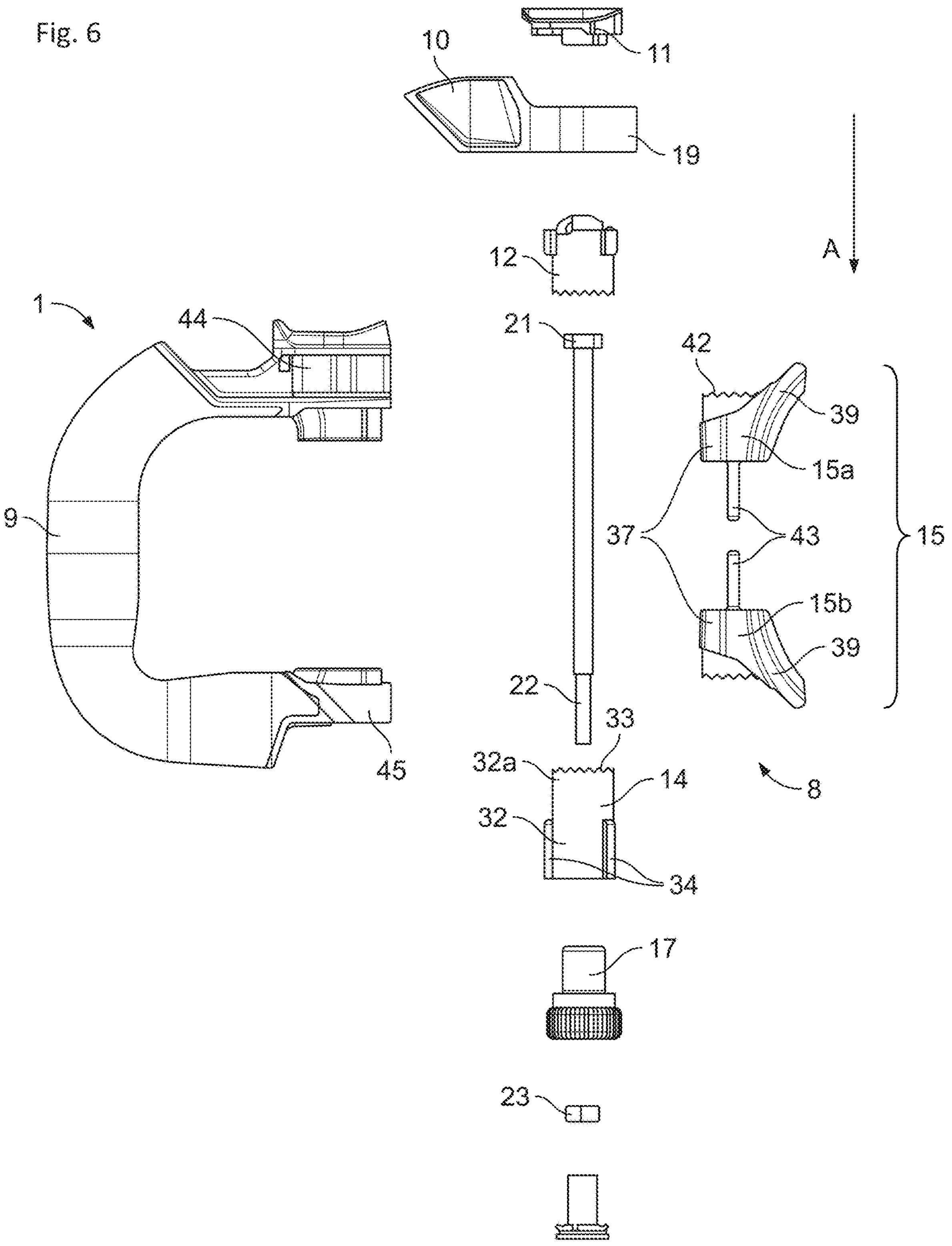
FIG. 6 is a first exploded view of the side handle.
Figure 7:
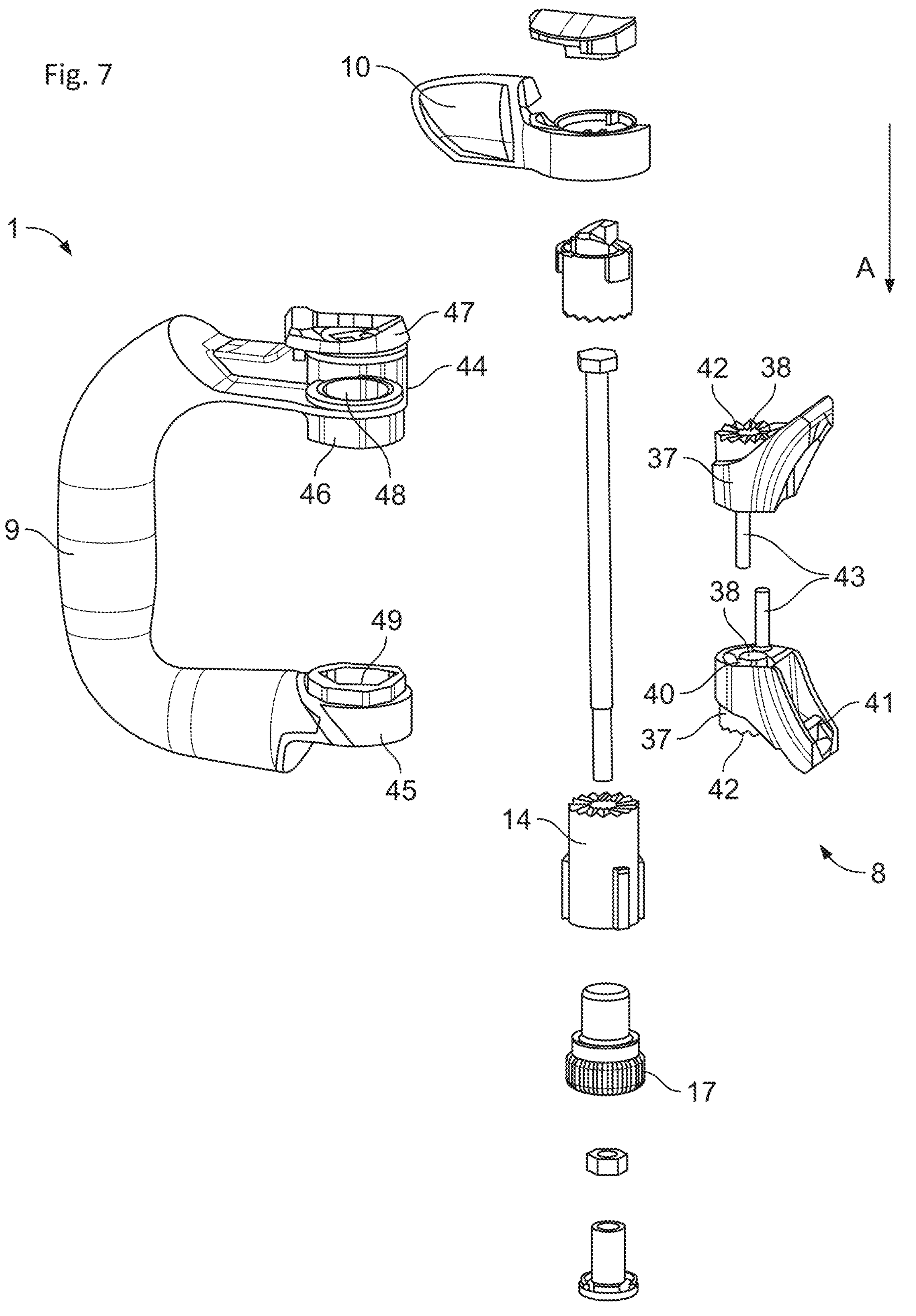
FIG. 7 is a second exploded view of the side handle.
Figure 8:
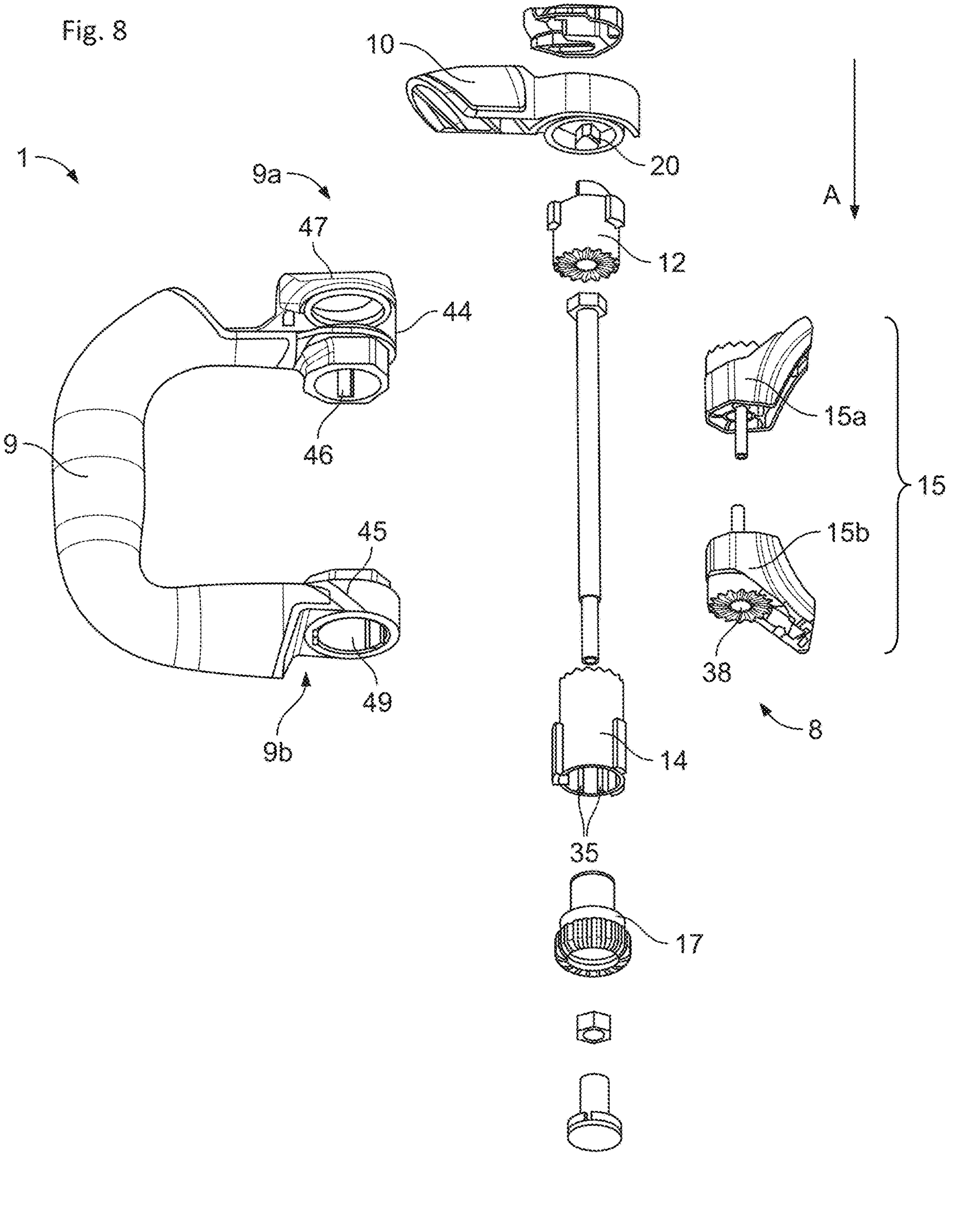
FIG. 8 is a third exploded view of the side handle.

In the present exemplary embodiment, the counter clamping element 14 is designed as a second latching sleeve. As shown in FIGS. 6 to 8, the counter clamping element 14 designed as a second latching sleeve contains a cylindrical main body 32 with a crown gear 33 at one end 32*a* of the main body 32. Three anti-rotation locks 34 in the form of elevations are likewise positioned on the outer lateral surface of the main body 32 of the second latching sleeve 14. Anti-rotation locks 35 in the form of elevations are likewise positioned on the inner lateral surface wall are of the main body 32 of the second latching sleeve 14.

The connecting device 15 is substantially used as a clamping strap holder for receiving and holding a clamping strap 36 and contains a first and a second connecting piece 15*a*, 15*b*. Both the first and the second connecting piece 15*a*, 15*b* each contain a cylindrical main body 37 with a central through-hole 38 and an arcuate guide arm 39. As indicated in FIG. 7, each main body 37 has a blind hole 40 laterally offset to the central through-hole 38. In the present exemplary embodiment, the first and second connecting pieces 15*a*, 15*b* are substantially identical. These arcuate guide arms 39 are used to guide the substantially circular clamping strap 36 and to closely abut the connecting pieces 15*a*, 15*b* against the tool neck 7 of the power tool 2.

Figure 2:
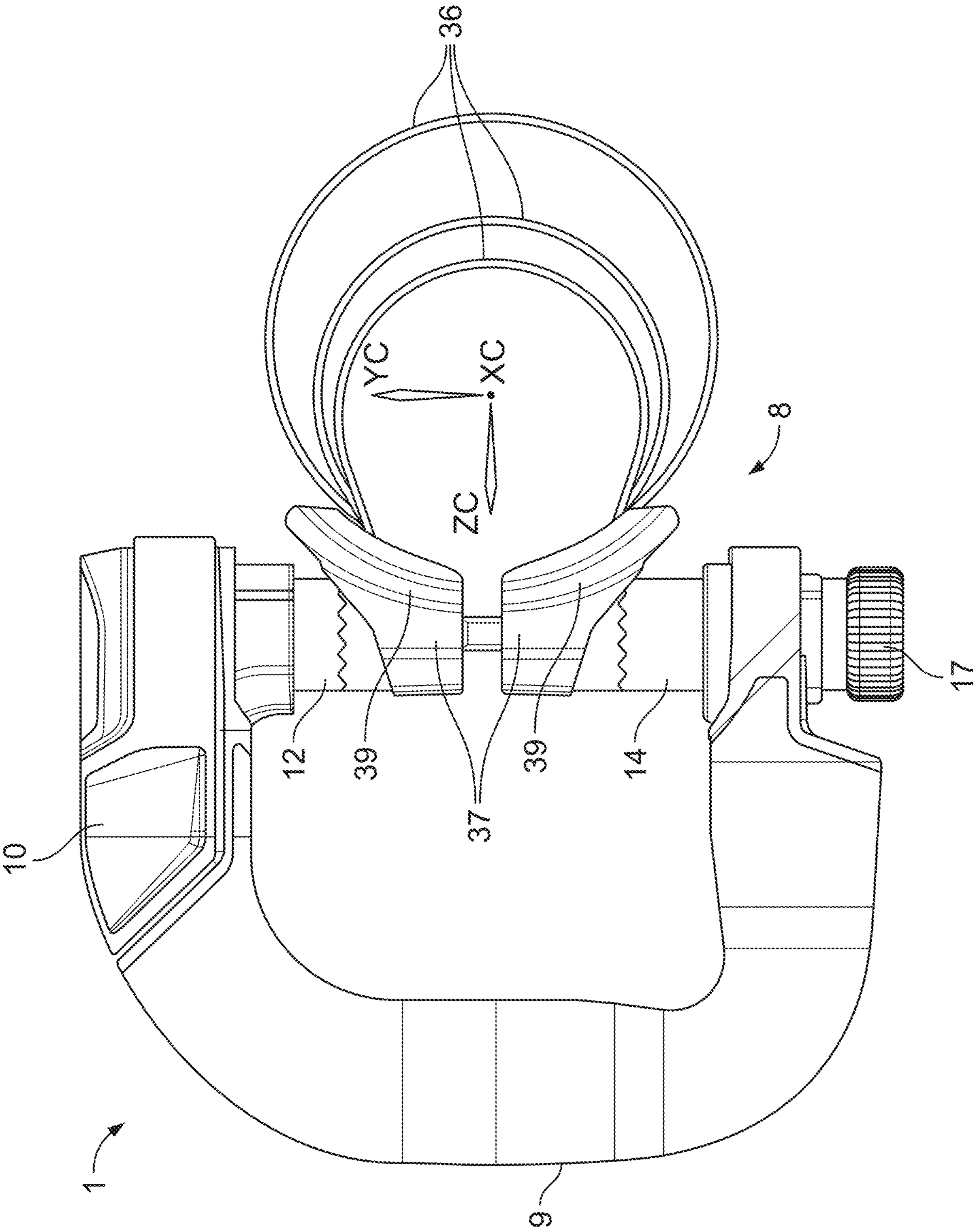
FIG. 2 is a first side view of a side handle in a clamped setting.
Figure 3:
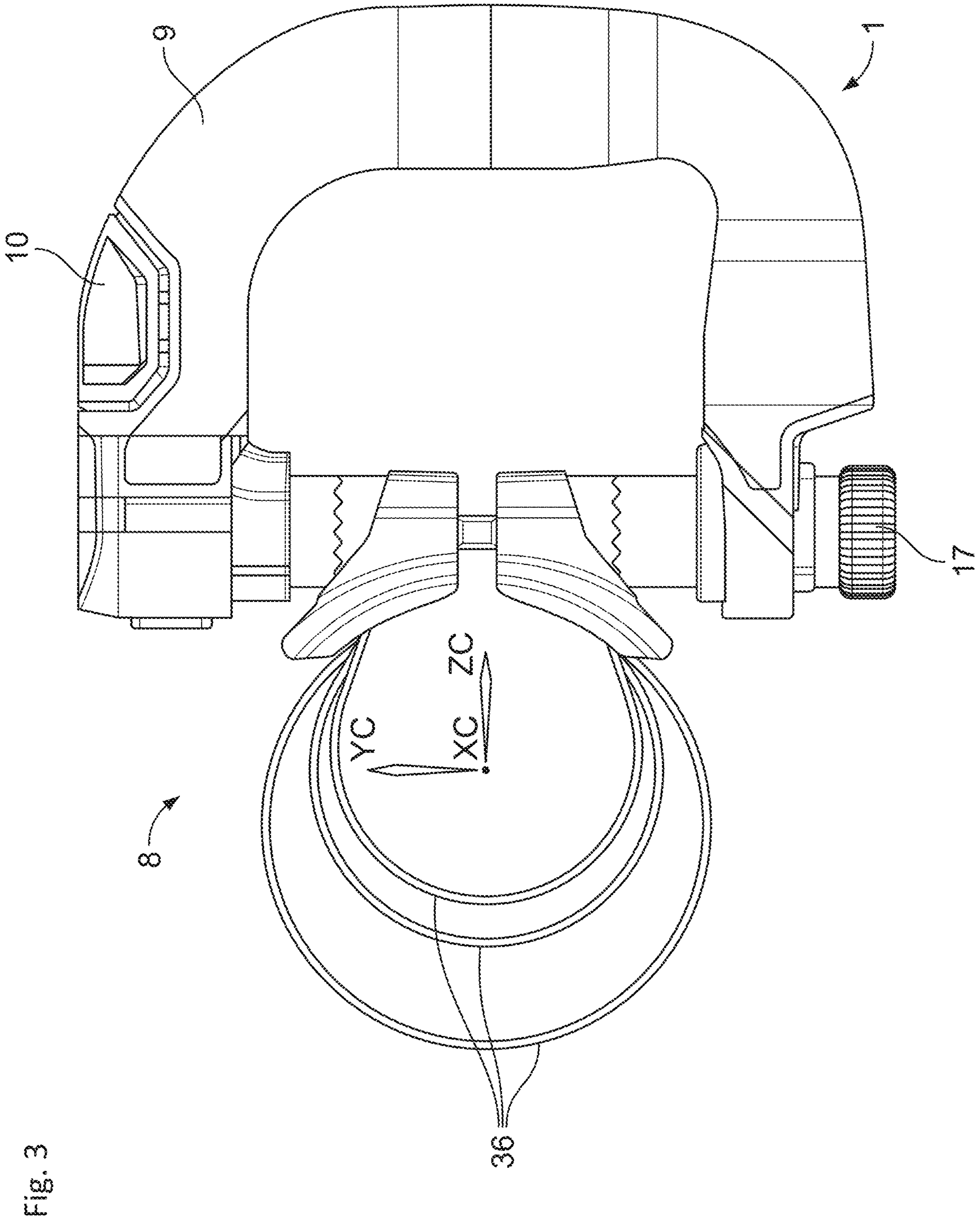
FIG. 3 is a second side view of the side handle in the clamped setting.
Figure 4:
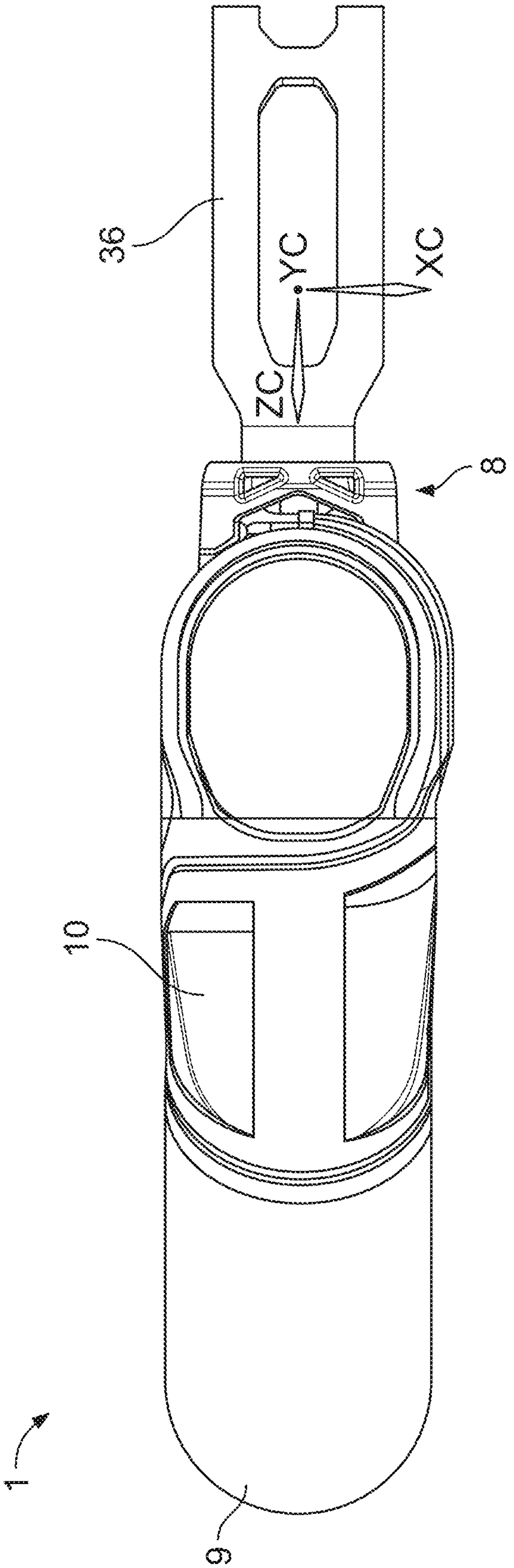
FIG. 4 is a plan view of the side handle in the clamped setting.

As indicated in FIGS. 2 and 3, the clamping strap 36 can have different diameters for correspondingly different diameters of a tool neck 7.

For receiving and holding the corresponding ends of the clamping strap 36, each arcuate guide arm 39 has a locking element 41 at a free end; cf. FIG. 7. The correspondingly bent ends of the clamping strap 36 can be hooked onto the locking element 41. The bent ends of the clamping strap 36 can also be referred to as hooks. A crown gear 42 is provided at a first end of each cylindrical main body 37. This crown gear 42 on a connecting piece 15*a*, 15*b* is designed to correspond to the crown gear 26, 33 on the first or second latching sleeves 12, 14. As additionally described below, the corresponding crown gear 42 on the connecting pieces 15*a*, 15*b* and on the latching sleeves 12, 14 is used for a detachable rotation lock between the latching sleeves 12, 14 and the connecting pieces 15*a*, 15*b*. A relevant pin 43 is positioned at a second end of each cylindrical main body 37 of the first and second connecting pieces 15*a*, 15*b*. The pin 43 is positioned laterally offset to the central through-hole 38 and, in relation to the central through-hole 38, opposite the blind hole 40 at the first end of the main body 37. If, as indicated in FIGS. 6 to 8, the two connecting pieces 15*a*, 15*b* are arranged opposite one another, the free end of the pin 43 can be brought from the first connecting piece 15*a* into the correspondingly designed blind hole 40 of the second connecting piece 15*b*. The connection of the pin 43 in the blind hole 40 prevents mutual twisting of the two connecting pieces 15*a*, 15*b* relative to one another.

The closure element 17 is designed substantially as a rotary closure or as a screw and is used as a sealing means at the lower end of the clamping unit 8 and as a receiving element for the thread and the screw nut of the clamping screw 13.

The gripping region 9 is arcuate and contains a first and a second end 9*a*, 9*b*. As can be seen in particular in FIG. 8, a sleeve element 44 is provided at the first end 9*a* and a guide element 45 is provided at the second end 9*b*. The sleeve element 44 at the first end 9*a* is substantially designed in two parts with a first and a second ring element 46, 47. The first ring element 46 contains three recesses 48, which are designed to correspond to the three anti-rotation locks 27 of the clamping element 12. The guide element 45 at the second end 9*b* is designed as a through-hole with three recesses 49. The recesses 49 are designed to correspond to the three anti-rotation locks 34 on the counter clamping element 14; cf. FIG. 8.

As shown in FIGS. 6 to 8, for mounting the side handle 1, the clamping element 12 designed as a first latching sleeve is positioned in the first ring element 47 of the gripping region 9. The clamping lever 10 is positioned on the gripping region 9 such that the driver element 19 is aligned with the circular receiving region 20 in the second ring element 47. The first and second connecting pieces 15*a*, 15*b* of the connecting device 15 are arranged opposite one another between the first ring element 46 and the guide element 45. The counter clamping element 14, which is designed as a second latching sleeve, is positioned in the guide element 45 designed as a through-hole.

The clamping screw 13 is guided with the second end 13*b* from above in the direction A through the sleeve element 44 of the gripping region 9, the driver element 19 of the clamping lever 10, the clamping element 12, the first and second connecting pieces 15*a*, 15*b*, the counter clamping element 14.

In the assembled state of the side handle 1, the crown gear 42 of the first connecting piece 15*a* engages in the crown gear 26 of the clamping element 12 and the crown gear 42 of the second connecting piece 15*b* engages in the crown gear 33 of the counter clamping element 14; cf. FIGS. 2, 3, 5 and 20.

At the first end 13*a* of the clamping screw 13, the screw nut 23 is mounted on the thread 22 and the closure element 17. The closure cap 11 closes the corresponding opening in the closure element 17.

Figure 5:
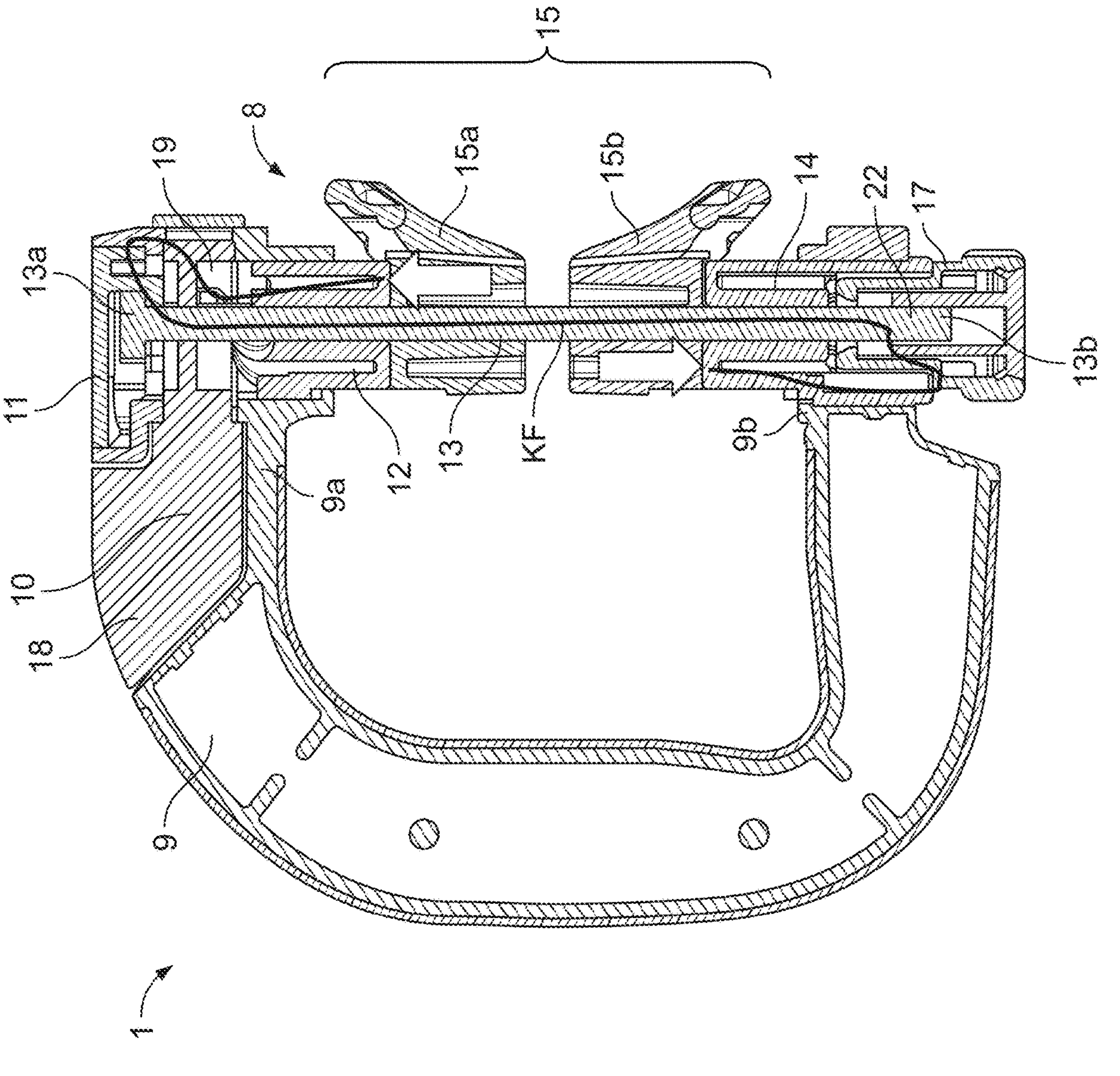
FIG. 5 is a sectional side view of the side handle in the clamped setting.

FIGS. 2 to 4 and 19 show the side handle 1 or the clamping unit 8 in a clamped state. In the clamped state, the side handle 1 is mounted fixedly or immovably on the tool neck 7 of the power tool 2 and cannot be rotated relative to the tool neck 7 so that the side handle 1 can be used for holding and guiding the power tool 2. As can be seen in the corresponding figures, in the clamped state, the operating element 18 of the clamping lever 10 ergonomically advantageously abuts in a corresponding recess against the gripping region 9. Due to the particular design of the driver element 19, the two elevations press against the rising portions of the helical ramp elements 29 of the clamping element 12 so that the driver element 19 presses the clamping element 12 in the direction A and against the direction of rotation DR and about the axis of rotation DA. In that the clamping element 12 is moved or pressed in the direction A, the clamping element 12 presses with its crown gear 26 onto the crown gear 42 of the first connecting piece 15*a*. In turn, the first connecting piece 15*a* is thereby moved in the direction A toward the second connecting piece 15*b*, or the two connecting pieces 15*a*, 15*b* are moved toward one another, so that the clamping strap 36 connected to the connecting pieces 15*a*, 15*b* is shortened or the diameter of the clamping strap 36 is reduced. As shown in FIG. 5, a force flow KF passes only through the clamping unit 8 and not through the gripping region 9. By shortening the clamping strap 36, the friction on the tool neck 7 of a power tool 2 is increased in such a way that the side handle 1 is fixedly connected to the housing 3 of the power tool 2.

Figure 20:
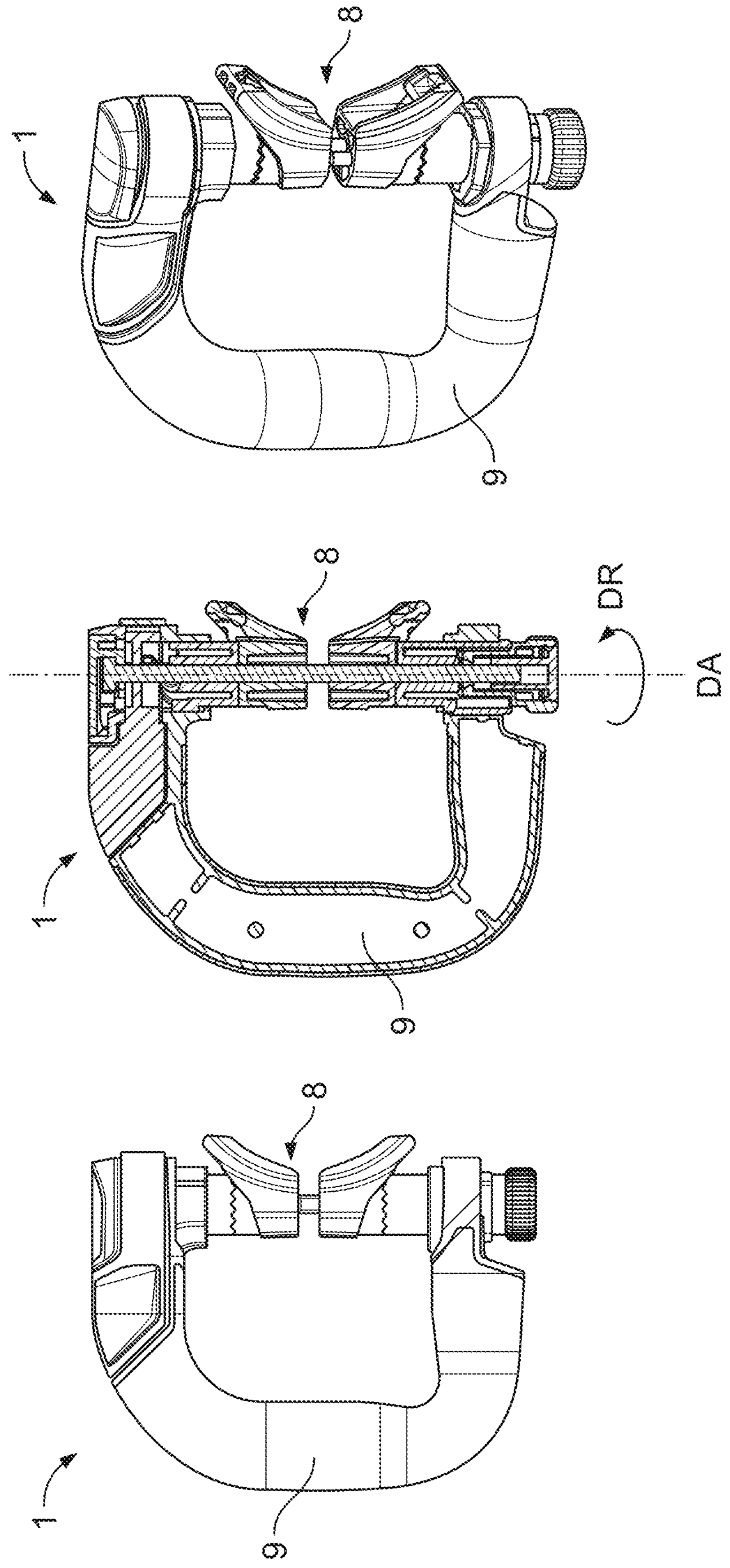
FIG. 20 is three views of the side handle with the clamping unit in a clamped state.
Figure 21:
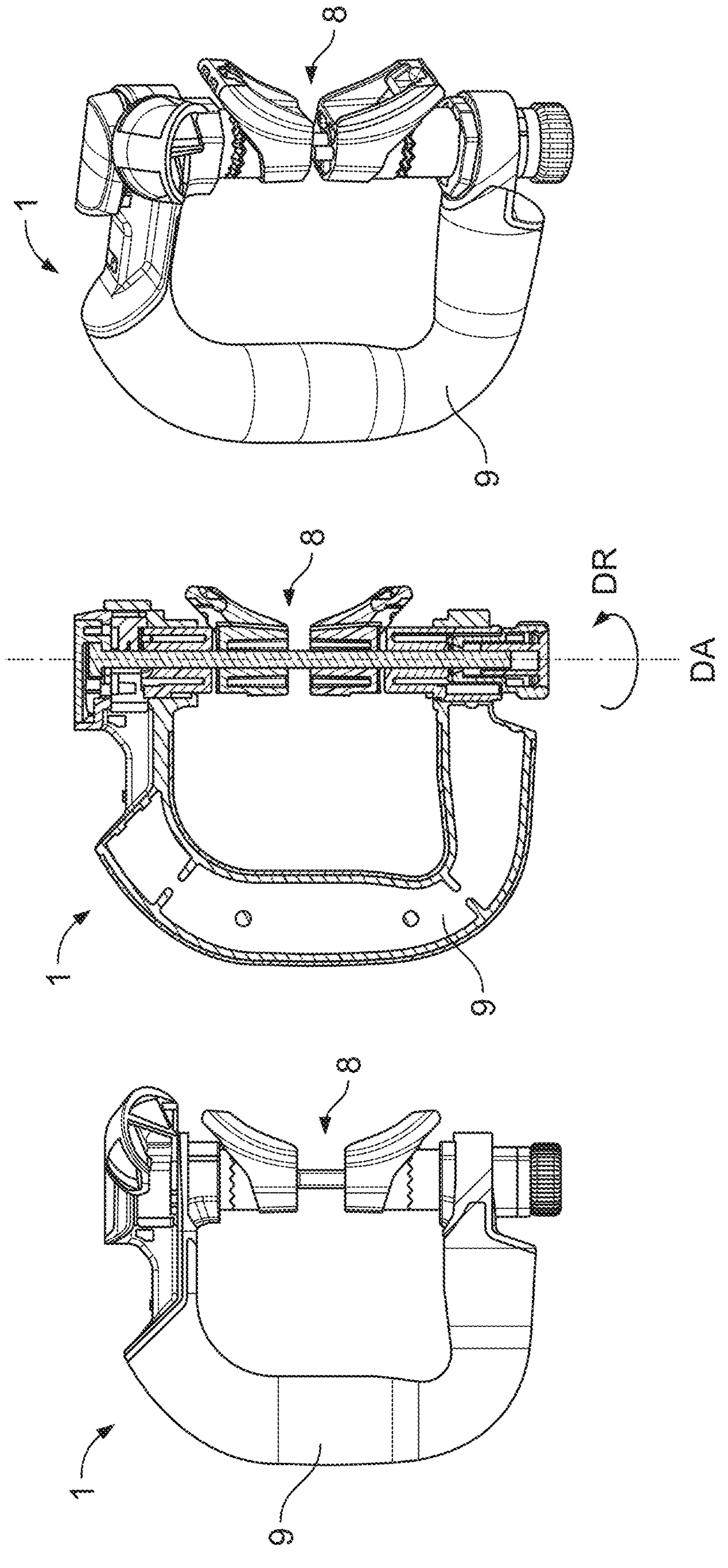
FIG. 21 is three views of the side handle with the clamping unit in a released state.

FIG. 20 shows the side handle 1 or the clamping unit 8 in a released state. In the released state, the diameter of the clamping strap 36 is enlarged so that the side handle 1 can be rotated relative to the tool neck 7 or can also be removed from the tool neck 7.

In order to detach the side handle 1 or the clamping unit 8, the clamping lever 10 is rotated in the direction of rotation DR about the axis of rotation DA so that the elevations 20*a*, 20*b* of the driver element 19 slide downward in the direction A on the inclinations of the ramp elements 29 of the clamping element 12 and pressure is no longer exerted by driver elements 19 on the ramp elements 29. As a result, the clamping element 12 and also the first connecting piece 15*a* can be moved against the direction A. The two connecting pieces 15*a*, 15*b* can be moved away from one another without the pressure of the driver element 19 on the clamping element 12, so that the clamping strap 36 connected to the connecting pieces 15*a*, 15*b* is released or the diameter of the clamping strap 36 is enlarged. The clamping element 12 is moved in the direction A relative to the sleeve element 44 of the gripping region 9 and the counter clamping element 14 is moved in the direction A relative to the guide element 45 of the gripping region 9.

The gripping region 9 can, for example, consist of or comprise polypropylene, ABS, polyamide or polyurethane. The clamping lever 10 can consist of the same material as the gripping region 9. The clamping lever 10 can consist of or comprise a thermoplastic elastomer (TPE).

LIST OF REFERENCE SIGNS

1 Side handle
2 Power tool
3 Housing of the power tool
4 Main handle
5 Tool holder
6 Tool
7 Tool neck
8 Clamping unit
9 Gripping region
9*a* First end of the gripping region
9*b* Second end of the gripping region
10 Clamping lever
11 Closure cap
12 Clamping element
13 Clamping screw
13*a* First end of the clamping screw
13*b* Second end of the clamping screw
14 Counter clamping element
15 Connecting device
15*a* First connecting piece
15*b* Second connecting piece
17 Closure element
18 Operating element
19 Driver element
20 Receiving region
20*a* First elevation of the driver element
20*b* Second elevation of the driver element
21 Screw head
22 Thread
23 Screw nut
24 Main body of the clamping element
24*a* First end
24*b* Second end
25 Ramp device
26 Crown gear of the clamping element
27 Anti-rotation lock of the clamping element
28 Slotted link
29 Ramp element

30 First portion of the slotted link
31 Second portion of the slotted link
32 Main body of the counter clamping element
32*a* End of the main body
33 Crown gear of the counter clamping element
34 Anti-rotation lock on the outer lateral surface of the counter clamping element
35 Anti-rotation lock on the inner lateral surface of the counter clamping element
36 Clamping strap
37 Main body of the connecting piece
38 Through-hole of the connecting piece
39 Guide arm
40 Blind hole
41 Locking element
42 Crown gear of a connecting piece
43 Pin
44 Sleeve element
45 Guide element
46 First ring element
47 Second ring element
48 Recess of the first ring element
49 Recess of the guide element
A Direction A
DA Axis of rotation
DR Direction of rotation
KF Force flow

What is claimed is:

1. A side handle for an electrical hand-held power tool, the side handle comprising:

a gripping region designed for gripping by a user; and a clamping unit, the side handle detachably fastenable via the clamping unit to a tool neck of the power tool, the clamping unit including a clamping lever for clamping and releasing the clamping unit, a clamp connected to the clamping lever, a counter clamp and a connector, the connector connected to the clamp and to the counter clamp and when the clamping unit is clamped, a force flow passes through the clamping unit and the counter clamp is moved relative to the gripping region;

the clamp including a ramp device having a first ramp and a second ramp, the first ramp having a first inclination and the second ramp having a second inclination, the first inclination being greater than the second inclination.

2. The side handle as recited in claim 1 wherein the gripping region includes at least one guide, the counter clamp guidable through the guide in at least one direction.

3. The side handle as recited in claim 2 wherein the guide includes a through-hole so that the counter clamp is guidable in an axial direction.

4. The side handle as recited in claim 1 wherein the clamp is designed as a first latching sleeve.

5. The side handle as recited in claim 1 wherein the counter clamp is designed as a counter clamp latching sleeve.

6. The side handle as recited in claim 1 wherein the connector includes a first and a second connecting piece.

7. The side handle as recited in claim 6 wherein the clamping unit further comprises a clamping strap, the clamping strap having a first bent end and a second bent end, the first connecting piece having a first lock, the second connecting piece having a second lock, the first bent end being hooked onto the first lock and the second bent end being hooked onto the second lock.

8. The side handle as recited in claim 6 wherein the first and second connecting pieces each include a central through-hole and an arcuate guide arm, the arcuate guide arms abutting the tool neck.

9. The side handle as recited in claim 8 wherein the first and second connecting pieces each have a cylindrical main body, the cylindrical main bodies each having a crown gear.

10. The side handle as recited in claim 1 further comprising a closure element connected to the counter clamp.

11. The side handle as recited in claim 10 wherein the clamping unit further comprises a clamping screw and a clamping nut, the clamping screw having a screw head and a thread, the closure element receiving the thread and the screw nut, the closure element sealing the lower end of the clamping unit.

12. The side handle as recited in claim 1 wherein the side handle is a chisel hammer side handle.

13. A chisel hammer comprising the side handle as recited in claim 1.

* * * * *